US012199956B2

(12) United States Patent
Ghazi et al.

(10) Patent No.: US 12,199,956 B2
(45) Date of Patent: *Jan. 14, 2025

(54) PURE DIFFERENTIALLY PRIVATE ALGORITHMS FOR SUMMATION IN THE SHUFFLED MODEL

(71) Applicant: Google LLC, Mountain View, CA (US)

(72) Inventors: Badih Ghazi, San Jose, CA (US); Noah Zeger Golowich, Lexington, MA (US); Shanmugasundaram Ravikumar, Piedmont, CA (US); Pasin Manurangsi, Mountain View, CA (US); Ameya Avinash Velingker, San Francisco, CA (US); Rasmus Pagh, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,339

(22) Filed: Jan. 3, 2024

(65) Prior Publication Data

US 2024/0236052 A1 Jul. 11, 2024

Related U.S. Application Data

(63) Continuation of application No. 17/122,638, filed on Dec. 15, 2020, now Pat. No. 11,902,259.

(Continued)

(51) Int. Cl.
*H04L 29/06* (2006.01)
*G06N 5/04* (2023.01)
(Continued)

(52) U.S. Cl.
CPC .......... *H04L 63/0428* (2013.01); *G06N 5/04* (2013.01); *G06N 20/00* (2019.01)

(58) Field of Classification Search
CPC ... H04L 63/0428; H04L 63/0421; G06N 5/04; G06N 20/00; G06N 3/084
See application file for complete search history.

(56) References Cited

U.S. PATENT DOCUMENTS

| 10,831,927 B2 * | 11/2020 | Chakraborty ....... G06F 21/6254 |
| 2018/0205707 A1 * | 7/2018 | Bellala ..................... H04L 9/085 |
| 2024/0045993 A1 * | 2/2024 | Wu ....................... G06F 21/6245 |

FOREIGN PATENT DOCUMENTS

| WO | WO-2020230061 A1 * | 11/2020 | ......... G06F 16/9535 |
| WO | WO/2021162738 | 8/2021 | |

OTHER PUBLICATIONS

Borja Balle; James Bell; Adria Gascón; Kobbi Nissim; "Private Summation in the Multi-Message Shuffle Model"; CCS '20: Proceedings of the 2020 ACM SIGSAC Conference on Computer and Communications Security; Nov. 2020; pp. 657-676 (Year: 2020).*

(Continued)

*Primary Examiner* — Fatoumata Traore
*Assistant Examiner* — Courtney D Fields
(74) *Attorney, Agent, or Firm* — DORITY & MANNING P.A.

(57) ABSTRACT

An encoding method for enabling privacy-preserving aggregation of private data can include obtaining private data including a private value, determining a probabilistic status defining one of a first condition and a second condition, producing a multiset including a plurality of multiset values, and providing the multiset for aggregation with a plurality of additional multisets respectively generated for a plurality of additional private values. In response to the probabilistic status having the first condition, the plurality of multiset values is based at least in part on the private value, and in response to the probabilistic status having the second condition, the plurality of multiset values is a noise message. The noise message is produced based at least in part on a (Continued)

noise distribution that comprises a discretization of a continuous unimodal distribution supported on a range from zero to a number of multiset values included in the plurality of multiset values.

20 Claims, 6 Drawing Sheets

Related U.S. Application Data

(60) Provisional application No. 62/970,379, filed on Feb. 5, 2020.

(51) Int. Cl.
  *G06N 20/00* (2019.01)
  *H04L 9/40* (2022.01)
  *H04L 9/06* (2006.01)
  *H04L 9/08* (2006.01)

(56) References Cited

OTHER PUBLICATIONS

Abadi et al., "Deep Learning with Differential Privacy", ACM Conference on Computer and Communications Security, Oct. 24-28, 2016, Vienna, Austria, 11 pages.
Abowd, "The U.S. Census Bureau Adopts Differential Privacy", ACM SIGKDD Conference on Knowledge Discover and Data Mining, Aug. 19-23, 2018, London, UK, 43 pages.
Agarwal et al., "Discrete Gaussian Leftover Hash Lemma over Infinite Domains", International Association for Cryptologic Research, Dec. 1-5, 2013, Bangalore, India, pp. 97-116.
Apple Differential Privacy Team, "Learning with Privacy at Scale", Apple Machine Learning, Dec. 2017, 9 pages.
Balcer et al., "Separating Local & Shuffled Differential Privacy via Histograms", arXiv:1911.06879v4, Apr. 14, 2020, 14 pages.
Balle et al., "Differentially Private Summation with Multi-Message Shuffling", arXiv:1906.09116v3, Aug. 21, 2019, 9 pages.
Balle et al., "Improved Summation from Shuffling", arXiv:1909.11225v1, Sep. 24, 2019, 13 pages.
Balle et al., "The Privacy Blanket of the Shuffle Model", arXiv:1903.02837v2, Jun. 2, 2019, 38 pages.
Bassily et al., "Local, Private, Efficient Protocols for Succinct Histograms", ACM Symposium on Theory of Computing, Jun. 14-17, 2015, Portland, OR, pp. 127-135.
Beimel et al., "Distributed Private Data Analysis: Simultaneously Solving How and What", International Cryptology Conference, Aug. 17-21, 2008, Santa Barbara, CA, pp. 451-468.
Bittau et al., "PROCHLO: Strong Privacy for Analytics in the Crowd", ACM Symposium on Operating Systems Principles, Oct. 28-31, 2017, Shanghai, China, 19 pages.
Blum et al., "A Learning Theory Approach to Non-Interactive Database Privacy", ACM Symposium on Theory of Computing, May 17-20, 2008, Victoria, Canada, 9 pages.
Bun et al., "Heavy Hitters and the Structure of Local Privacy", ACM SIGMOD/PODS Conference, Jun. 10-15, 2018, Houston, TX, pp. 435-447.
Bun et al., "Simultaneous Private Learning of Multiple Concepts", ACM Conference on Innovations in Theoretical Computer Science, Jan. 14-17, 2016, Cambridge, MA, pp. 369-380.
Chan et al., "Optimal Lower Bound for Differentially Private Multi-Party Aggregation", European Symposium on Algorithms, Sep. 10-12, 2012, Ljubljana, Slovenia, 16 pages.
Cheu et al., "Distributed Differential Privacy via Shuffling", International Conference on the Theory and Applications of Cryptographic Techniques, May 19-23, 2019, Darmstadt, Germany, pp. 375-403.

De, "Lower Bounds in Differential Privacy", IACR Theory of Cryptography Conference, Mar. 19-21, 2012, Taormina, Italy, pp. 321-338.
Ding et al., "Collecting Telemetry Data Privately", arXiv:1712.01524v1, Dec. 5, 2017, 16 pages.
Dwork et al., "Calibrating Noise to Sensitivity in Private Data Analysis", Theory of Cryptography Conference, Mar. 4-7, 2006, New York, NY, pp. 265-284.
Dwork et al., "Our Data, Ourselves: Privacy Via Distributed Noise Generation", International Cryptology Conference, May 28-Jun. 1, 2006, Saint Petersburg, Russia, pp. 486-503.
Dwork et al., "The Algorithmic Foundations of Differential Privacy", Foundations and Trends in Theoretical Computer Science, vol. 9, Nos. 3-4, 2014, 281 pages.
Erlingsson et al., "Amplification by Shuffling: From Local to Central Differential Privacy via Anonymity", ACM-SIAM Symposium on Discrete Algorithms, Jan. 6-9, 2019, San Diego, CA, pp. 2468-2479.
Erlingsson et al., "RAPPOR: Randomized Aggregatable Privacy-Preserving Ordinal Response", ACM Conference on Computer and Communications Security, Nov. 3-7, 2014, Scottsdale, AZ, pp. 1054-1067.
Gentry et al., "Trapdoors for Hard Lattices and New Cryptographic Constructions", ACM Symposium on Theory of Computing, May 17-20, 2008, Victoria, Canada, pp. 197-206.
Ghazi et al., "On the Power of Multiple Anonymous Messages", arXiv:1908.11358v4, May 19, 2020, 70 pages.
Ghazi et al., "Private Aggregation from Fewer Anonymous Messages", arXiv:1909.11073v2, Oct. 15, 2019, 30 pages.
Ghazi et al., "Scalable and Differentially Private Distributed Aggregation in the Shuffled Model", arXiv:1906.08320v3, Dec. 2, 2019, 18 pages.
Greenberg, "Apple's 'Differential Privacy' Is AboutCollecting Your Data—But Not Your Data", Wired, Jun. 13, 2016, 5 pages.
Hardt et al., "A Multiplicative Weights Mechanism for Privacy-Preserving Data Analysis", IEEE 51st Annual Symposium on Foundations of Computer Science, Oct. 23-26, 2010, Las Vegas, NV, pp. 61-70.
Hardt et al., "On the Geometry of Differential Privacy", ACM Symposium on Theory of Computing, Jun. 6-8, 2010, Cambridge, MA, pp. 705-714.
Ishai et al., "Cryptography from Anonymity", 47th Annual IEEE Symposium on Foundations of Computer Science, Oct. 22-24, 2006, Berkeley, CA, 10 pages.
Kairouz et al., "Advances and Open Problems in Federated Learning", arXiv:1912.04977v1, Dec. 10, 2019, 105 pages.
Kasiviswanathan et al., "What Can We Learn Privately?", 49th Annual IEEE Symposium on Foundations of Computer Science, Oct. 25-28, 2008, Philadelphia, PA, pp. 531-540.
Keilson et al., "Some Results for Discrete Unimodality", Journal of the American Statistical Association, vol. 66, No. 334, Jun. 1971, 5 pages.
Konecny et al., "Federated Learning: Strategies for Improving Communication Efficiency", arXiv:1610.05492v1, Oct. 18, 2016, 5 pages.
Melis et al., "Efficient Private Statistics with Succinct Sketches", Network and Distributed System Security Symposium, Feb. 21-24, 2016, San Diego, CA, 15 pages.
Micciancio et al., "Worst-Case to Average-Case Reductions Based on Gaussian Measures", SIAM Journal on Computing, vol. 37, No. 1, 2007, pp. 267-302.
Mironov, "Renyi Differential Privacy", IEEE 30th Computer Security Foundations Symposium, Aug. 21-25, 2017, Santa Barbara, CA, pp. 263-275.
Nikolov et al., "The Geometry of Differential Privacy: The Sparse and Approximate Cases", 45th ACM Symposium on the Theory of Computing, Jun. 1-4, 2014, Palo Alto, CA, pp. 351-360.
Shankland, "How Google tricks itself to protect Chrome user privacy", CNET, Oct. 31, 2014, 4 pages.
Steinke et al., "Between Pure and Approximate Differential Privacy", arXiv:1501.06095v1, Jan. 24, 2015, 15 pages.

(56) References Cited

OTHER PUBLICATIONS

Vadhan, "The Complexity of Differential Privacy", Harvard University, Center for Research on Computation & Society, Tutorial, Aug. 9, 2016, 95 pages.

Warner, "Randomized Response: A Survey Technique for Eliminating Evasive Answer Bias", Journal of the American Statistical Association, vol. 60, No. 309, 8 pages.

Tao et al., "Efficient Privacy-preserving Multi-functional Data Aggregation Scheme for Multi-tier IoT System", 2023 IEEE Symposium on Computers and Communications (ISCC), Feb. 2023, pp. 857-863.

* cited by examiner

---
Algorithm 1: Randomizer for binary summation
---
1: Procedure: BINARY RANDOMIZER$_{E,n}(X)$
2:     Let $p,d,s$ be as Lemma 9 (depending on $E,n$)
3:     $a \leftarrow \text{Ber}(p)$
4:     if $a = 0$ then
5:         if $x = 0$ then
6:             return the multiset with $(\frac{d-1}{2})$ ones and $(\frac{d+1}{2})$ zeros
7:         else
8:             return the multiset with $(\frac{d+1}{2})$ ones and $(\frac{d-1}{2})$ zeros
9:     else
10:         $z \leftarrow \text{DLap}_d(d/2, s)$
11:         return the multiset with $z$ ones and $(d - z)$ zeros
---

FIG. 4A

---
Algorithm 2: Analyzer for binary summation
---
1: Procedure: BINARY RANDOMIZER$_{E,n}(R)$
2:     Let $d$ be as in Lemma 9 (depending on the $E,n$)
3:     return $\frac{n}{2} + \sum_{y \in R} (y - \frac{1}{2})$
---

FIG. 4B

| Algorithm 3: Randomizer for real summation |
|---|

1: Procedure REALRANDOMIZER$_{(Ej) j \in N, n}(X)$
2:    for $j = 1$ to $2 \log n$ do
3:       $x[j] \leftarrow j$th most signifogant bit of $x$
4:       $S_j \leftarrow$ BINARYRANDOMIZER$_{Ej, n}(x[j])$       $S_j$ is a multiset of zero and ones
5:       $R_j \leftarrow \{j\} \times S_j$       $R_j$ is a multiset of tuples $(j,0)$ and $(j,1)$
6:    return $\cup_{j=1}^{2\log n} R_j$

FIG. 5A

| Algorithm 4: Analyzer for real summation |
|---|

1: Procedure REALANALYZER$_{(Ej) j \in N, n}(R)$
2:    for $j = 1$ to $2 \log_2 n$ do
3:       $Rj \leftarrow \{y_1 \mid y \in R \text{ and } y_0 = j\}$       Multiset of bit messages for the $j$th bit.
4:       $a_j \leftarrow$ BINARYANALYZER$_{Ej, n}(R_j)$
5:    return $\sum_{j=1}^{2 \log n} a_j/2^j$

FIG. 5B

PURE DIFFERENTIALLY PRIVATE ALGORITHMS FOR SUMMATION IN THE SHUFFLED MODEL

CROSS REFERENCE TO RELATED APPLICATIONS

The present application is a continuation of U.S. application Ser. No. 17/122,638 having a filing date of Dec. 15, 2020, which claims filing benefit of U.S. Provisional Patent Application Ser. No. 62/970,379 having a filing date of Feb. 5, 2020. Applicant claims priority to and the benefit of each of such applications and incorporates all such applications herein by reference in its entirety.

FIELD

The present disclosure relates generally to distributed aggregation. More particularly, the present disclosure relates to scalable and differentially private distributed aggregation, for example, in the shuffled model.

BACKGROUND

Given a number of different private values that reside on a number of different devices, it may be desirable to compute a sum and/or mean of such private values. For instance, this basic problem can be used as a subroutine in several learning and optimization tasks where data is distributed across several clients.

However, it may also be desirable to compute such sum or mean in a privacy-preserving way, such that no device other than the client device has access to or the ability to compute the private value (with some guarantees). This process may be referred to as secure and distributed aggregation.

One example scenario in which such secure and distributed aggregation is desirable is federated learning. Federated learning promises to make machine learning feasible on distributed, private datasets by implementing gradient descent using secure aggregation methods. The idea is to compute a global weight update without revealing the contributions of individual users.

Current practical protocols for secure aggregation work in an "honest but curious" setting where a curious adversary observing all communication to and from the server cannot learn any private information assuming the server is honest and follows the protocol.

A more scalable and robust primitive for privacy-preserving protocols is shuffling of user data, so as to hide the origin of each data item. Highly scalable and secure protocols for shuffling, so-called mixnets, have been proposed as a primitive for privacy-preserving analytics in the Encode-Shuffle-Analyze framework by Bittau et al.

Recent work in the so-called "shuffled model" has suggested protocols for secure aggregation that achieve differential privacy guarantees. These protocols come at a cost, though: Either the expected aggregation error or the amount of communication per user scales as a polynomial $n^{\Omega(1)}$ in the number of users n.

SUMMARY

Aspects and advantages of implementations of the present disclosure will be set forth in part in the following description, or can be learned from the description, or can be learned through practice of the implementations.

One example aspect of the present disclosure is directed to a computer-implemented method to enable privacy-preserving aggregation of private data. In some implementations, the method can include obtaining, by one or more computing devices, private data including a private value. For instance, in some implementations, the private value can be a binary value.

In some implementations, the method can include determining, by one or more computing devices, a probabilistic status defining one of a first condition and a second condition. For instance, in some implementations, determining, by the one or more computing devices, the probabilistic status defining one of the first condition and the second condition can include sampling a first probability distribution to receive a first value or a second value, wherein the first condition includes receipt of the first value and the second condition includes receipt of the second value. In some implementations, the first probability distribution can be a Bernoulli distribution.

In some implementations, the method can include producing, by the one or more computing devices, a multiset including a plurality of multiset values. For instance, in some implementations, the plurality of multiset values can include a plurality of one values and a plurality of zero values. In some implementations, the method can include, in response to the probabilistic status having the first condition, producing a multiset including a plurality of multiset values wherein the plurality of multiset values is based at least in part on the private value. In some implementations, the method can include, in response to the probabilistic status having the second condition, producing a multiset including a plurality of multiset values wherein the plurality of multiset values includes a noise message, wherein the noise message is produced based at least in part on a noise distribution that includes a discretization of a continuous unimodal distribution supported on a range from zero to a number of multiset values included in the plurality of multiset values. For instance, in some implementations, producing, by the one or more computing devices, the multiset including a plurality of multiset values can include, in the first condition wherein the first value is received, producing the multiset wherein the plurality of multiset values is based at least in part on the private value and in the second condition wherein the second value is received, the method can include sampling the noise distribution to receive a randomizer value and producing the multiset wherein the plurality of multiset values includes the noise message, wherein the noise message is based at least in part on the randomizer value. In some implementations, the noise distribution can be within a multiplicative factor of an underlying distribution of the private data. In some implementations, the noise distribution can be a truncated discrete Laplacian distribution. In some implementations, the plurality of multiset values based at least in part on the private value can include an amount of zero values greater by one than an amount of one values if the private value equals zero and an amount of one values fewer by one than an amount of zero values if the private value equals one. In some implementations, the noise message can include a plurality of one values and a plurality of zero values, wherein an amount of the plurality of one values is equivalent to a randomizer value sampled from the noise distribution and an amount of the plurality of zero values is equivalent to the randomizer value subtracted from the number of multiset values included in the plurality of multiset values.

In some implementations, the method can include providing, by one or more computing devices, the multiset for aggregation with a plurality of additional multisets respectively generated for a plurality of additional private values. For instance, in some implementations, providing, by the one or more computing devices, the multiset for aggregation can include transmitting, by the one or more computing devices, the multiset to a shuffler model configured to shuffle the multiset with the plurality of additional multisets. In some implementations, the method can include evaluating a sum of the multiset and the plurality of additional multisets. In some implementations, providing, by the one or more computing devices, the multiset for aggregation can include adding half of a total amount of the plurality of additional multisets to the sum of the plurality of multiset values. In some implementations, providing, by the one or more computing devices, the multiset for aggregation can include debiasing each of the plurality of multiset values.

Another example aspect of the present disclosure is directed to a computer-implemented method to enable privacy-preserving aggregation of private data. In some implementations, the method can include obtaining, by one or more computing devices, private data including a private vector. In some implementations, the private vector can include an ordered plurality of private values. For instance, in some implementations, the private vector can include a binary representation of a real number, wherein each of the ordered plurality of private values includes a bit of the binary representation. In some implementations, the private vector can include a histogram, wherein each of the ordered plurality of private values includes an encoding of an element of the histogram. In some implementations, the encoding can be a one-hot encoding, wherein the ordered plurality of private values includes a single first value and a plurality of second values.

In some implementations, the method can include producing, by the one or more computing devices, an ordered plurality of multisets respective to the ordered plurality of private values, each of the ordered plurality of multisets respectively including a plurality of multiset values.

In some implementations, for each of the ordered plurality of multisets, the method can include determining, by the one or more computing devices, a probabilistic status defining one of a first condition and a second condition. For instance, in some implementations, determining, by the one or more computing devices, the probabilistic status defining one of the first condition and the second condition can include sampling a first probability distribution to receive a first value or a second value, wherein the first condition includes receipt of the first value and the second condition includes receipt of the second value. In some implementations, the first probability distribution can be a Bernoulli distribution.

In some implementations, the method can include, in response to the probabilistic status having the first condition, producing a multiset wherein the plurality of multiset values is based at least in part on the private value. In some implementations, the method can include, in response to the probabilistic status having the second condition, producing a multiset wherein the plurality of multiset values includes a noise message, wherein the noise message is produced based at least in part on a noise distribution that includes a discretization of a continuous unimodal distribution supported on a range from zero to a number of multiset values included in the plurality of multiset values. For instance, in some implementations, the plurality of multiset values can include a plurality of one values and a plurality of zero values. In some implementations, the method can include, in response to the probabilistic status having the first condition, producing a multiset including a plurality of multiset values wherein the plurality of multiset values is based at least in part on the private value. In some implementations, the method can include, in response to the probabilistic status having the second condition, producing a multiset including a plurality of multiset values wherein the plurality of multiset values includes a noise message, wherein the noise message is produced based at least in part on a noise distribution that includes a discretization of a continuous unimodal distribution supported on a range from zero to a number of multiset values included in the plurality of multiset values. For instance, in some implementations, producing, by the one or more computing devices, the multiset including a plurality of multiset values can include, in the first condition wherein the first value is received, producing the multiset wherein the plurality of multiset values is based at least in part on the private value and in the second condition wherein the second value is received, the method can include sampling the noise distribution to receive a randomizer value and producing the multiset wherein the plurality of multiset values includes the noise message, wherein the noise message is based at least in part on the randomizer value. In some implementations, the noise distribution can be within a multiplicative factor of an underlying distribution of the private data. In some implementations, the noise distribution can be a truncated discrete Laplacian distribution. In some implementations, the plurality of multiset values based at least in part on the private value can include an amount of zero values greater by one than an amount of one values if the private value equals zero and an amount of one values fewer by one than an amount of zero values if the private value equals one. In some implementations, the noise message can include a plurality of one values and a plurality of zero values, wherein an amount of the plurality of one values is equivalent to a randomizer value sampled from the noise distribution and an amount of the plurality of zero values is equivalent to the randomizer value subtracted from the number of multiset values included in the plurality of multiset values.

In some implementations, the method can include providing, by the one or more computing devices, the plurality of ordered multisets for ordered aggregation with an ordered plurality of additional multisets respectively generated for a plurality of additional private vectors. For instance, in some implementations, providing, by the one or more computing devices, the ordered plurality of multisets for ordered aggregation can include transmitting, by the one or more computing devices, the ordered plurality of multisets to a shuffler model configured to shuffle the ordered plurality of multisets with the ordered plurality of additional multisets while maintaining an order of the ordered plurality of multisets and the ordered plurality of additional multisets.

In some implementations the, method can include generating a plurality of respective sums for each multiset in the ordered plurality of multisets, each of the plurality of respective sums including a sum of the plurality of multiset values from a respective multiset. In some implementations, the method can include providing a combinatorial sum of the respective sums for each of the plurality of private values, the combinatorial sum recombining the respective sums with respect to an order of the ordered plurality of multisets and the ordered plurality of additional multisets. In some implementations, a sequence of decreasing values of an error parameter is associated with a sequence of bits in the binary representation.

In some implementations, a computing system can be configured to perform any portion of the computer-implemented method according to example aspects of the present disclosure. In some implementations, one or more non-transitory computer-readable media can collectively store instructions that, when executed by one or more processors, cause the one or more processors to perform any portion of the computer-implemented method according to example aspects of the present disclosure. In some implementations, the one or more computing devices can be or include a user device.

Other aspects of the present disclosure are directed to various systems, apparatuses, non-transitory computer-readable media, user interfaces, and electronic devices.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

The referenced provisional application describe example implementations of the proposed techniques in greater detail. The referenced provisional application is incorporated into and form a part of this disclosure. However, the present disclosure is not limited to the example implementations provided in the referenced provisional application.

BRIEF DESCRIPTION OF THE DRAWINGS

Detailed discussion of implementations directed to one of ordinary skill in the art is set forth in the specification, which makes reference to the appended figures, in which:

FIG. 4A depicts a diagram an example algorithm for encoding private data according to example implementations of the present disclosure.

FIG. 4B depicts a diagram of an example algorithm for analyzing encoded data according to example implementations of the present disclosure.

FIG. 5A depicts a diagram of an example algorithm for encoding private data according to example implementations of the present disclosure.

FIG. 5B depicts a diagram of an example algorithm for analyzing encoded data according to example implementations of the present disclosure.

Figure 1:
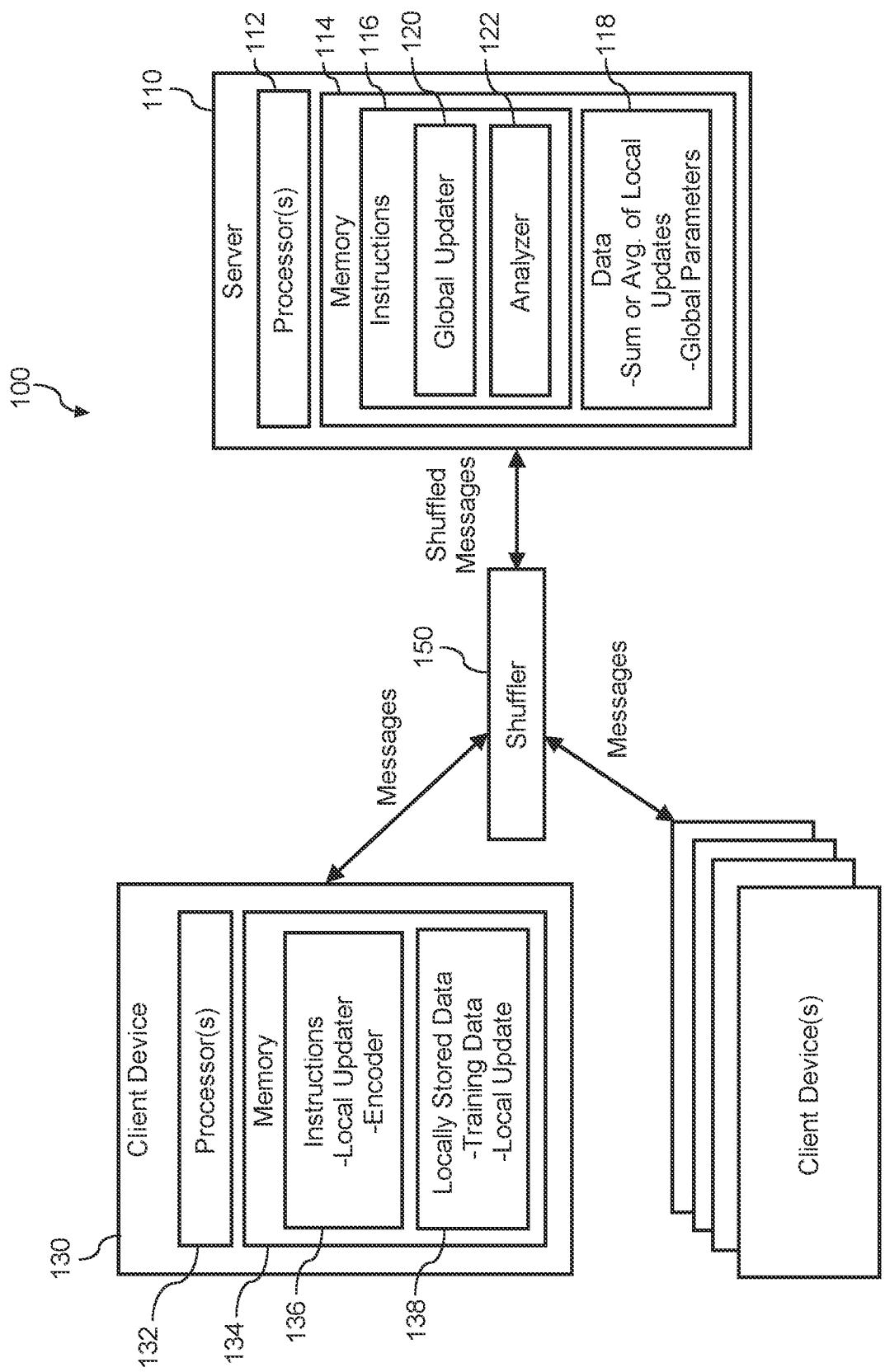
FIG. 1 depicts a block diagram of an example computing system according to example implementations of the present disclosure.

Reference numerals that are repeated across plural figures are intended to identify the same features in various implementations.

DETAILED DESCRIPTION

Overview

Generally, the present disclosure is directed to scalable and differentially private distributed aggregation, for example, in the shuffled model. In particular, the present disclosure proposes an efficient protocol for pure differentially private aggregation for both binary cases and real number cases in the shuffled model, where communications can increase polylogarithmically in the number of users n, and error can, in fact, be constant. The proposed technique is, conceptually, a randomizer that randomly introduces a noise message in place of a message representing a user's data. In some implementations, a noise distribution used in generating the noise can be selected to mimic an underlying distribution of the user data, such as the user data across the n users. In some implementations, a noise distribution used in generating the noise can be a discretization of a continuous unimodal distribution supported on a range from zero to a number of multiset values included in a plurality of multiset values representing a message.

More particularly, example aspects of the present disclosure are directed to the problem of privately summing n numbers in a shuffled model. For consistency with the literature, the term aggregation is used for the sum operation. Generally, aspects of the present disclosure are discussed with reference to a sum operation for the purpose of illustration. However, any suitable operation, such as, for example, a mean operation, can be employed in accordance with the present disclosure.

In the shuffled model, each client or user of a plurality of clients or users sends one or more messages to a trusted shuffler, which permutes the messages amongst all the users, then passes the shuffled messages to an analyst. The shuffled model can be particularly useful in cases where the analyst is not trusted, as the permutation and/or shuffling of messages can prevent the analyst from learning information from the users.

Despite the presence of a shuffler, however, in certain existing systems, it can still be possible for an intelligent adversary to learn information from a user in the shuffled model. For instance, in certain existing systems, if an adversary is observing the shuffled data and a user input is changed, it may be possible for the adversary to deduce information about the changing user input based on a corresponding change in the shuffled data. For example, protocols wherein each user samples a number of messages that depend on the user's input, independently samples a number of noise messages, and sends these messages to the shuffler, wherein the analyzer then outputs the number of messages "consistent with" a queried input, can observe a shift in the distribution of the message count observed by the analyzer when a single input is changed, which can be detectable by the analyzer. Even further, in some cases, an adversary deducing information from the user input can result in the adversary learning more user inputs, up to all of the user inputs. Thus, it can be desirable to eliminate the possibility for an adversary to deduce information about the user input, which can be achieved by a pure-differentially private protocol.

Figure 2:
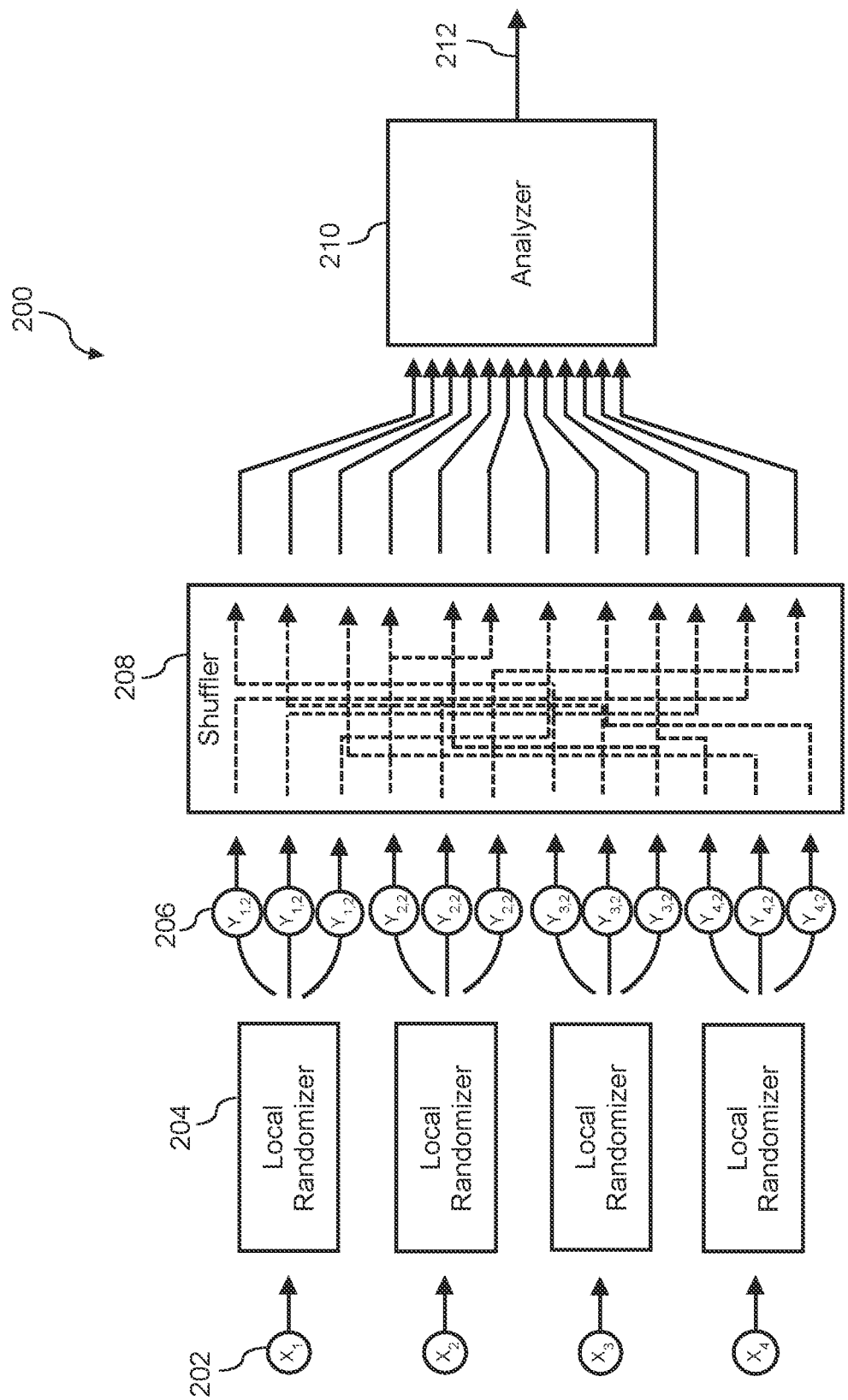
FIG. 2 depicts a block diagram of an example encoding and analysis process for secure multi-party aggregation according to example implementations of the present disclosure.

Generally (e.g., as depicted in FIG. 2), a protocol P in the shuffled model can include a randomizer algorithm R (e.g., randomizer 204), a shuffler algorithm S (e.g., shuffler 208), and an analyzer algorithm A (e.g., analyzer 208). A randomizer algorithm 204 can receive a user's private data 202 as input and produce a plurality of messages 206 (also referred to herein as a "multiset") based on the private data. The shuffler algorithm 208 can receive a plurality of multisets 206 and shuffle and/or permute the plurality of multisets 206 to produce a plurality of shuffled multisets, or, in other words, a uniform random permutation of the input multisets. The analyzer algorithm 210 can receive the plurality of shuffled multisets and output some desired output 212 from the plurality of shuffled multisets, such as an aggregate of the private data, without knowing the exact private data. In the shuffled model, it is generally assumed that the randomizer 204 and shuffler 208 are trustworthy, while analyzer 210 may not necessarily be trustworthy. In other words, the privacy in the shuffled model can be guaranteed with respect to the input to the analyzer 210, i.e. the output of the shuffler 208. Aspects of the present disclosure are generally related to the randomizer algorithm 204 and/or the analyzer algorithm 208. Generally, any suitable shuffler algorithm 206 can be employed in accordance with the present disclosure. For instance, the shuffler algorithm 206 can be implemented according to any suitable shuffling algorithm, such as, but not limited to, onion routing, mixnets, third-party servers, and/or secure hardware, or combination thereof, in accordance with the present disclosure.

A protocol P in the shuffled model is said to be $(\varepsilon, \delta)$-differentially private if every pair of datasets X and X' differing on a single data point, and for every subset S of transcripts of P, it is the case that:

$$Pr[P(X) \in S] \le e^\varepsilon * Pr[P(X') \in S] + \delta$$

where probabilities are defined with respect to the randomness in P. A protocol in the shuffled model is pure differentially private (pure-DP), also referred to as $\varepsilon$-differentially private ($\varepsilon$-DP), if the shuffler $\delta$ is equal to zero. If the shuffler $\delta$ is greater than zero, a protocol is said to be approximately differentially private (approximately-DP).

Pure-DP protocols can be highly desirable, as they can guarantee protection against leakage of user data. Pure-DP protocols have generally been discovered with respect to differentially private models other than the shuffled model, such as, for example, the central model and/or local model, but have generally not been as readily discovered for the shuffled model. Furthermore, known protocols in the shuffled model can only achieve a utility advantage over the local modal in the case of approximate-DP solutions. Thus, it is desirable for a pure-DP protocol with respect to the shuffled model, and especially a pure-DP protocol for the shuffled model that achieves a utility advantage, such as, for example, fewer communications and/or improved privacy, over other protocols, such as other protocols for a local model.

Thus, the present disclosure describes a non-interactive pure-DP binary summation protocol for the shuffled model for a real number $\varepsilon$. The binary summation protocol can have a constant error on the order of $O_\varepsilon(1)$. Additionally, the binary summation protocol can require each of n users to send only $O_\varepsilon(\log n)$ messages, where each message consists of a single bit.

Figure 3:
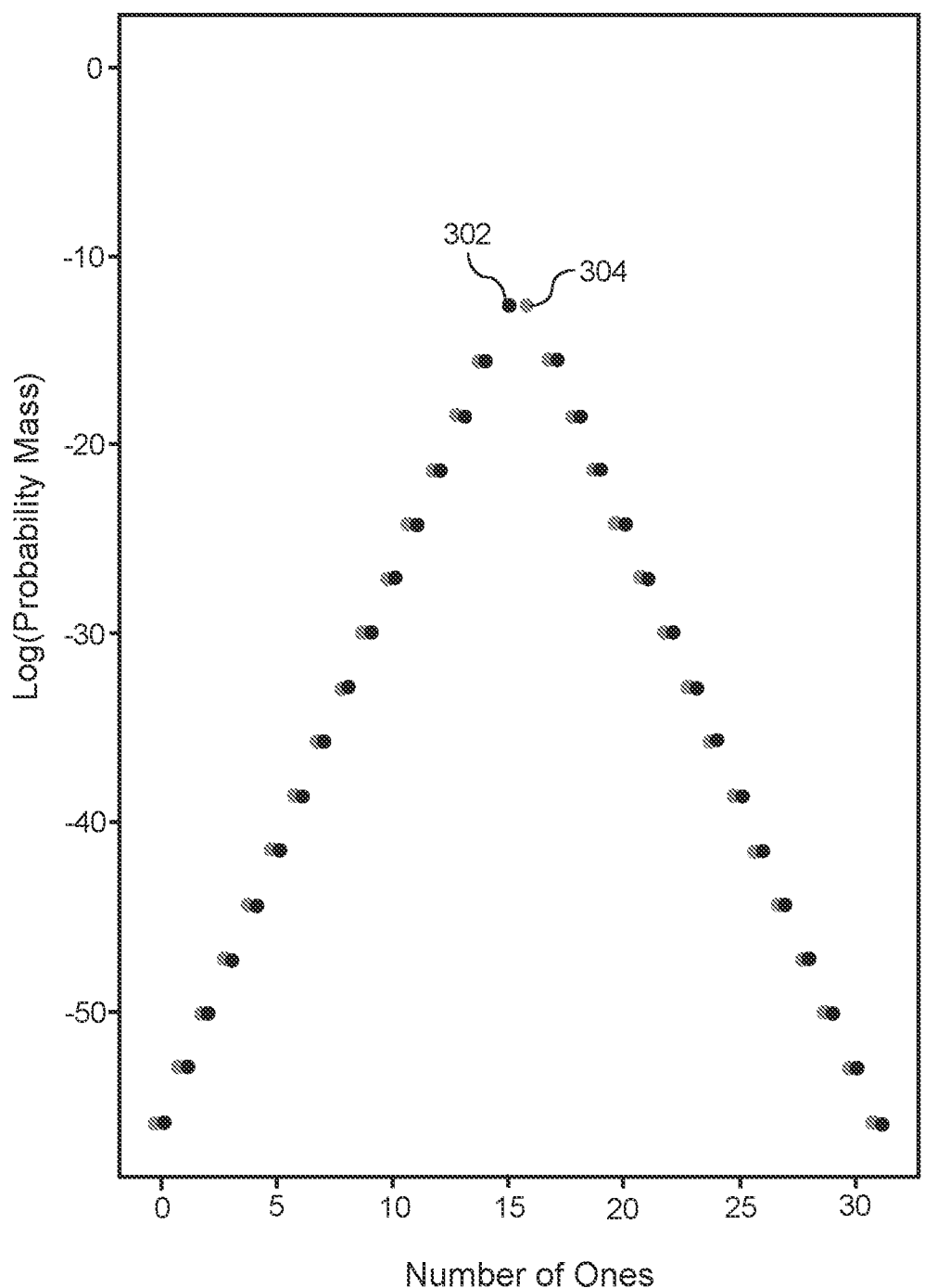
FIG. 3 depicts a plot of example probability mass functions from an example randomizer algorithm according to example implementations of the present disclosure.

For instance, one example binary randomizer is described in Algorithm 1, which is presented in FIG. 4A. As presented in FIG. 4A and onwards, d is a number of messages (e.g., in a multiset), s is the inverse scaling exponent, and p is a noise probability. Algorithm 1 illustrates, for a user input x, sampling a value a from a probability distribution, and in the example of Algorithm 1, a Bernoulli distribution, to determine if noise is introduced at the user input x or not. In one case, and in the example of Algorithm 1, if the sampling value a is zero, then the output of the algorithm is a multiset, where the values of the multiset are based on the user input x. For instance, in this case, if x=0, the algorithm recites returning a multiset with one fewer ones than zeroes. Otherwise, the algorithm recites returning a multiset with one greater ones than zeroes. For instance, the returned multiset can be provided to a shuffler. If the sampling value a is nonzero, however, the algorithm recites returning a multiset including a noise message. In this case, a second probability distribution is sampled for an integer z, and a noise message having z ones (and remainder zeroes) is returned. In some implementations, the zero and one values within the multiset and/or noise message can be randomly ordered. In this configuration, the probability mass functions of the number of zeroes and/or the number of ones output by the randomizer can be within a small multiplicative factor of each other, regardless of user input. This principle is graphically depicted for two example mass functions under a condition of a zero user input (e.g., represented by plot 302) and a one user input (e.g., represented by plot 304) in FIG. 3.

One example binary analyzer is described in Algorithm 2, which is presented in FIG. 4B. For instance, the binary analyzer of Algorithm 2 can be implemented to analyze shuffled data sourced by the binary randomizer of Algorithm 1. Algorithm 2 illustrates a sum of each message y with a subtracted debiasing term, which in this case is one half. The sum of each message with subtracted debiasing term is additionally added to an amount of half the total number of users n. Thus, Algorithm 2 depicts an example binary analyzer, which can be implemented to aggregate some desired data from a plurality of multisets. For instance, Algorithm 2 can be implemented to approximate a number of users that have input a one value, such as without knowing or being able to determine the particular users that have input a one value.

Furthermore, the present disclosure describes a non-interactive pure-DP real number summation protocol with constant error and polylogarithmic communication per user. The real number summation protocol can be used, for example, in cases where each user input is a real number from [0,1]. The real summation protocol can have a constant error on the order of $O_\varepsilon(1)$. Additionally, the real summation protocol can require each of n users to send only $O_\varepsilon(\log^3 n)$ messages, where each message consists of $O(\log(\log(n)))$ bits.

For instance, one example real number randomizer is described in Algorithm 3, which is presented in FIG. 5A. The real number randomizer as described in Algorithm 3 can be applied to private vectors including an ordered plurality of private values, such as binary vectors. For instance, in one embodiment, a private vector can include an ordered plurality of binary data corresponding to a binary representation of a real number, or approximation thereof, such as a floating point representation of a real number. Additionally and/or alternatively, a private vector can include a representation of a histogram. For example, a private vector can include an encoding of a histogram, wherein the ordered plurality of private data corresponds to the encoding of the histogram, such as a one-hot encoding. In some implementations, a sequence of decreasing values of an error parameter can be associated with a sequence of bits in the binary representation. For instance, a largest value in a sequence of values of an error parameter can be associated with a least significant bit, and a smallest value in the sequence of values can be associated with a most significant bit. This can allow for a total privacy parameter to be small, while allowing the overall error to be a constant times an error in a sum of the most significant bits of the inputs. For instance, the sequence of values can be a geometrically decreasing sequence.

The example real number randomizer of Algorithm 3 can employ a binary randomizer in accordance with the present disclosure, such as the binary randomizer described in Algorithm 1, or variations thereof. For instance, Algorithm 3 recites performing binary randomization on each of the plurality of private values (e.g., bits) in the private vector to receive a multiset for each of the plurality of private values. Algorithm 3 recites ordering the multisets based on the ordering of the private vector. For instance, Algorithm 3 recites generating a multiset of tuples (j, S) where, in each tuple in the multiset, j is the position and/or ordering of the private value, and S is a value of the multiset for the private value. Algorithm 3 recites returning a union of the multiset of tuples for all of the plurality of private values. For instance, the multiset of tuples can be provided to a shuffler. By including the ordering in the tuple, subsequent systems in the shuffling protocol can thus maintain an ordering of the messages in the tuples while remaining agnostic to the private data and/or private vectors for which the tuples were generated.

One example real number analyzer is described in Algorithm 4. For instance, the real number analyzer of Algorithm 4 can be implemented to analyze shuffled data sourced by the real number randomizer of Algorithm 3. Algorithm 4 recites, for each position in the private vectors, generating a multiset of messages for the position. For instance, the multiset of messages can be bit messages, having zero or one values (e.g., extracted from the tuples). Algorithm 4 recites providing each multiset to a binary analyzer. For instance, the binary analyzer can be the binary analyzer described in Algorithm 2, or variation thereof. The binary analyzer can provide a sum of each multiset. Algorithm 4 recites generating a combinatorial sum of the sums of each multiset. For instance, the combinatorial sum can be evaluated with respect to the ordering, such that, for example, binary coefficients provided by the sums can be reordered based on the position (e.g., depending from the private vectors) that are associated with the sums. For example, in one example case, a bit of a private vector can be used to generate a multiset of tuples, tuples from that multiset can be shuffled with tuples from multisets from bits at the same position within other private vectors, and the resulting shuffled multisets can be recombined at the analyzer at the corresponding bit of an aggregate value.

One example application of the techniques described herein in a machine learning context is gradient descent-based federated learning. The idea is to avoid collecting user data, and instead compute weight updates in a distributed manner by sending model parameters to users, locally running stochastic gradient descent on private data, and aggregating model updates over all users. Using a secure aggregation protocol guards against information leakage from the update of a single user, since the server only learns the aggregated model update.

Although federated learning is one useful application, many other applications exist as well. For example, the proposed techniques can easily be applied to other problems such as: finding heavy hitters (e.g., finding the most commonly typed words into a virtual keyboard); entropy estimation; quantile estimation; support size estimation; and/or other problems. The proposed algorithms can be used for aggregation in conjunction with any context that demonstrates the linearity property.

The systems and methods of the present disclosure provide a number of technical effects and benefits, including, as one example, reducing probability of a privacy failure event associated with secure aggregation of private data. In particular, the systems and methods described herein can provide for a pure-DP technique for use with the shuffled model, which can prevent an adversary, especially an adversarial analyzer, from learning any and/or all of the private data. For example, the privacy analysis for many existing secure aggregation protocols assumes of an "honest but curious" server that does not deviate from the protocol, so some level of trust in the secure aggregation server is required. In contrast, protocols based on shuffling operate with much weaker assumptions on the server. In addition to this advantage, along with providing differential privacy guarantees, an overall communication cost of the proposed new protocol scales less-than-linearly with the number of users, and furthermore has constant error with respect to number of users.

With reference now to the Figures, example implementations of the present disclosure will be discussed in further detail.

Example Devices and Systems

FIG. 1 depicts an example computing system 100 that can be used to implement one example application of the methods and systems of the present disclosure in the federated learning context. Federated learning is provided as one example only, the proposed aggregation techniques can be applied to many other different problems/applications. The system 100 can be implemented using a client-server architecture that includes a server 110 that communicates with one or more client devices 130 and/or a shuffler 150 over a network.

Each client device 130 can include one or more processor(s) 132 and a memory 134. The one or more processor(s) 132 can include, for example, one or more central processing units (CPUs), graphics processing units (GPUs) dedicated to efficiently rendering images or performing other specialized calculations, and/or other processing devices. The memory 134 can include one or more computer-readable media and can store information accessible by the one or more processors 132, including instructions 136 that can be executed by the one or more processors 132 and data 138.

The instructions 136 can include instructions for implementing a local updater configured to determine one or more local updates to a machine-learned model (e.g., a set of values descriptive of changes to the model parameters based on a set of locally stored training data). For example, the local updater can perform one or more training techniques such as, for example, backwards propagation of errors to re-train or otherwise update the model based on the locally stored training data. The local updater can be included in an application or can be included in the operating system of the device 130.

The locally stored data 138 such as the local update can be considered private data. The local update is used only as one example of private data that can be securely aggregated. Any form of private data can be securely aggregated according to the described techniques.

The instructions 136 can further include instructions for implementing a randomizer or encoder to randomize/encode the private data such as the local update. For example, the randomizer/encoder can perform one or more of the randomizing/encoding techniques described herein (e.g., the binary randomizer of Algorithm 1 shown in FIG. 4A and/or the real number randomizer of Algorithm 3 shown in FIG. 5A). In particular, the randomizer can randomize the private data into multiset including a plurality of multiset values or messages and the messages can be transmitted to a shuffler 150.

The client device 130 of FIG. 1 can include various input/output devices for providing and receiving information from a user, such as a touch screen, touch pad, data entry keys, speakers, and/or a microphone suitable for voice recognition.

The client device 130 can also include a network interface used to communicate with one or more remote computing devices (e.g. server 110) over the network. The network interface can include any suitable components for interfacing with one more networks, including for example, transmitters, receivers, ports, controllers, antennas, or other suitable components.

The shuffler 150 can receive a respective plurality of messages from each of the client devices 130 and can randomly shuffle them so that the messages are randomly distributed amongst each other without regard to which of the plurality of different devices 130 generated each message. In some implementations, multiple shufflers can be used (e.g., sequentially) to provide added layer(s) of privacy assurance.

The system 100 also includes a server 110, such as a web server. The server 110 can be implemented using any suitable computing device(s). The server 110 can have one or more processors 112 and one or more memory devices 114. The server 110 can be implemented using one server device or a plurality of server devices. In implementations in which a plurality of devices is used, such plurality of devices can operate according to a parallel computing architecture, a sequential computing architecture, or a combination thereof.

The server 110 can also include a network interface used to communicate with one or more client devices 130 over the network. The network interface can include any suitable components for interfacing with one more networks, including for example, transmitters, receivers, ports, controllers, antennas, or other suitable components.

The one or more processors 112 can include any suitable processing device, such as a microprocessor, microcontroller, integrated circuit, logic device, or other suitable processing device. The one or more memory devices 114 can include one or more computer-readable media, including, but not limited to, non-transitory computer-readable media, RAM, ROM, hard drives, flash drives, or other memory devices. The one or more memory devices 114 can store information accessible by the one or more processors 112, including computer-readable instructions 116 that can be executed by the one or more processors 112.

The instructions 116 can be any set of instructions that when executed by the one or more processors 112, cause the one or more processors 112 to perform operations. For instance, the instructions 116 can be executed by the one or more processors 112 to implement a global updater 120. The global updater 120 can be configured to update a global model based at least in part on a sum or average of local updates computed at the client devices 130.

The instructions 116 can further include instructions that cause the server 110 to implement an analyzer 122. The analyzer 122 can determine the sum or average of local updates based on the shuffled messages. The analyzer 122 can perform any of the analysis techniques described herein, including the binary analyzer of Algorithm 2 shown in FIG. 4B and/or the real number analyzer of Algorithm 4 shown in FIG. 5B.

As shown in FIG. 1, the one or more memory devices 114 can also store data 118 that can be retrieved, manipulated, created, or stored by the one or more processors 112. The data 118 can include, for instance, local updates, global parameters, and other data. The data 118 can be stored in one or more databases. The one or more databases can be connected to the server 110 by a high bandwidth LAN or WAN, or can also be connected to server 110 through the network. The one or more databases can be split up so that they are located in multiple locales.

The server 110 can exchange data with one or more client devices 130 and/or shuffler 150 over the network. Any number of client devices 130 can be connected to the server 110 and/or shuffler 150 over the network. Each of the client devices 130 can be any suitable type of computing device, such as a general purpose computer, special purpose computer, laptop, desktop, mobile device, navigation system, smartphone, tablet, wearable computing device, gaming console, a display with one or more processors, or other suitable computing device.

The network can be any type of communications network, such as a local area network (e.g. intranet), wide area network (e.g. Internet), cellular network, or some combination thereof. The network can also include a direct connection between a client device 130 and the server 110. In general, communication between the server 110 and a client device 130 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Method

Figure 6:
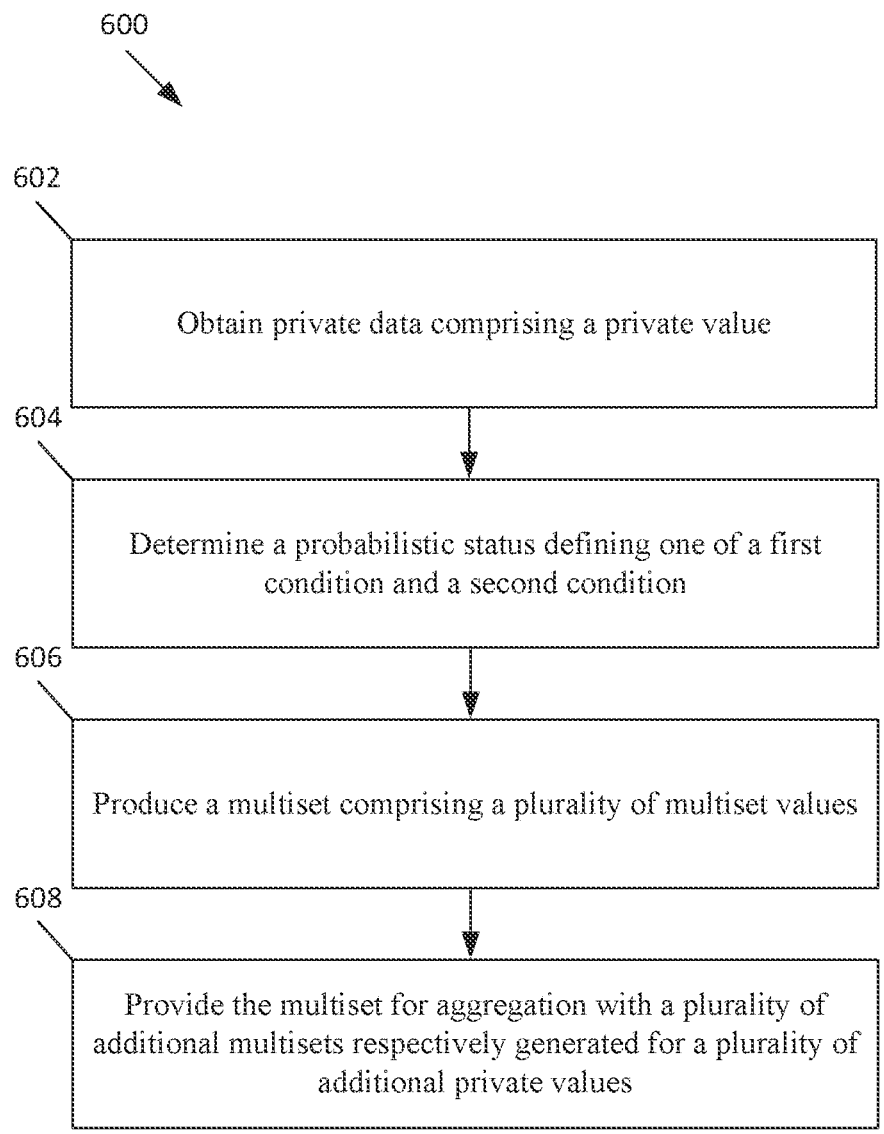
FIG. 6 depicts a flow chart diagram of an example method for privacy-preserving aggregation of private data according to example implementations of the present disclosure.

FIG. 6 depicts a flow chart diagram of an example method 600 for privacy-preserving aggregation of private data according to example implementations of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 can include, at 602, obtaining (e.g., by one or more computing devices) private data comprising a private value. In some implementations, the private vector can include an ordered plurality of private values. For instance, in some implementations, the private vector can include a binary representation of a real number, wherein each of the ordered plurality of private values includes a bit of the binary representation. In some implementations, the private vector can include a histogram, wherein each of the ordered plurality of private values includes an encoding of an element of the histogram. In some implementations, the encoding can be a one-hot encoding, wherein the ordered plurality of private values includes a single first value and a plurality of second values.

The method 600 can include, at 604, determining (e.g., by the one or more computing devices) a probabilistic status defining one of a first condition and a second condition. In some implementations, determining the probabilistic status defining one of the first condition and the second condition can include sampling a first probability distribution to receive a first value or a second value, wherein the first condition includes receipt of the first value and the second condition includes receipt of the second value. In some implementations, the first probability distribution can be a Bernoulli distribution.

The method 600 can include, at 606, producing (e.g., by the one or more computing devices) a multiset comprising a plurality of multiset values. In response to the probabilistic status having the first condition, the plurality of multiset values can be based at least in part on the private value. In response to the probabilistic status having the second condition, the plurality of multiset values can be or can include a noise message. The noise message can be produced based at least in part on a noise distribution that includes a discretization of a continuous unimodal distribution supported on a range from zero to a number of multiset values included in the plurality of multiset values. For instance, in some implementations, the plurality of multiset values can include a plurality of one values and a plurality of zero values.

In some implementations, the method can include, in response to the probabilistic status having the first condition, producing a multiset including a plurality of multiset values wherein the plurality of multiset values is based at least in part on the private value. In some implementations, the method can include, in response to the probabilistic status having the second condition, producing a multiset including a plurality of multiset values wherein the plurality of multiset values includes a noise message, wherein the noise message is produced based at least in part on a noise distribution that includes a discretization of a continuous unimodal distribution supported on a range from zero to a number of multiset values included in the plurality of multiset values. For instance, in some implementations, producing, by the one or more computing devices, the multiset including a plurality of multiset values can include, in the first condition wherein the first value is received, producing the multiset wherein the plurality of multiset values is based at least in part on the private value and in the second condition wherein the second value is received, the method can include sampling the noise distribution to receive a randomizer value and producing the multiset wherein the plurality of multiset values includes the noise message, wherein the noise message is based at least in part on the randomizer value. In some implementations, the noise distribution can be within a multiplicative factor of an underlying distribution of the private data. In some implementations, the noise distribution can be a truncated discrete Laplacian distribution.

In some implementations, the plurality of multiset values based at least in part on the private value can include an amount of zero values greater by one than an amount of one values if the private value equals zero and an amount of one values fewer by one than an amount of zero values if the private value equals one. In some implementations, the noise message can include a plurality of one values and a plurality of zero values, wherein an amount of the plurality of one values is equivalent to a randomizer value sampled from the noise distribution and an amount of the plurality of zero values is equivalent to the randomizer value subtracted from the number of multiset values included in the plurality of multiset values.

The method 600 can include, at 608, providing (e.g., by the one or more computing devices) the multiset for aggregation with a plurality of additional multisets respectively generated for a plurality of additional private values. For instance, in some implementations, providing, by the one or more computing devices, the multiset for aggregation can include transmitting, by the one or more computing devices, the multiset to a shuffler model configured to shuffle the multiset with the plurality of additional multisets. In some implementations, the method can include evaluating a sum of the multiset and the plurality of additional multisets. In some implementations, providing, by the one or more computing devices, the multiset for aggregation can include adding half of a total amount of the plurality of additional multisets to the sum of the plurality of multiset values. In some implementations, providing, by the one or more computing devices, the multiset for aggregation can include debiasing each of the plurality of multiset values.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured for privacy-preserving aggregation of private data, the computing system comprising:
   one or more processors; and
   one or more memory devices storing:
   a randomizer configured to generate multisets based on sampling a value of a probabilistic status, wherein:
      the randomizer is configured to generate noise multisets responsive to the probabilistic status having a first condition,
      the randomizer is configured to generate, responsive to the probabilistic status having a second condition, input-dependent multisets that are correlated to the noise multisets; and
   computer-readable instructions that, when implemented, cause the one or more processors to perform operations, the operations comprising:
      inputting a private value to the randomizer;
      generating, using the randomizer, a multiset comprising one of a noise multiset or an input-dependent multiset; and
      outputting the multiset for aggregation.

2. The computing system of claim 1, wherein the randomizer is configured to generate the noise multisets and the input-dependent multisets to have a same size.

3. The computing system of claim 1, wherein the noise multiset is produced based in part on a noise distribution comprising a discretization of a continuous underlying distribution.

4. The computing system of claim 3, wherein the discretization of the continuous underlying distribution is supported on a range from zero to a size of the multiset.

5. The computing system of claim 3, wherein generating, using the randomizer, a multiset, the multiset comprising a noise multiset responsive to the probabilistic status having the first condition comprises sampling the noise distribution to generate a randomizer value, the noise multiset based on the randomizer value.

6. The computing system of claim 5, wherein the noise multiset comprises an amount of one values equal to the randomizer value sampled from the noise distribution and an amount of zero values equal to the randomizer value subtracted from a size of the multiset.

7. The computing system of claim 3, wherein the noise distribution is within a multiplicative factor of an underlying distribution of the private value.

8. The computing system of claim 3, wherein the noise distribution comprises a truncated discrete Laplacian distribution.

9. The computing system of claim 3, wherein the continuous underlying distribution comprises a unimodal distribution.

10. The computing system of claim 1, wherein the probabilistic status is determined based on a Bernoulli distribution.

11. The computing system of claim 1, wherein:
the randomizer is configured to generate, responsive to the private value having a first value, a first input-dependent multiset comprising a plurality of binary of values in which a quantity of zero values is greater than a quantity of one values; and
the randomizer is configured to generate, responsive to the private value having a second value, a second input-dependent multiset comprising a plurality of binary of values in which a quantity of one values is greater than a quantity of zero values.

12. The computing system of claim 11, wherein the first value is 1 and the second value is 0.

13. The computing system of claim 1, wherein:
the randomizer is configured to generate, responsive to the input private value having a value of 1, a first input-dependent multiset comprising a plurality of binary of values in which a quantity of zero values is one greater than a quantity of one values; and
the randomizer is configured to generate, responsive to the input private value having a value of 0, a second input-dependent multiset comprising a plurality of binary of values in which a quantity of one values is one greater than a quantity of zero values.

14. The computing system of claim 1, wherein the private value comprises an ordered vector corresponding to a binary representation of a real number, and wherein the input-dependent multiset comprises a message respective to each of a plurality of bit positions of the ordered vector.

15. A computing system configured for privacy-preserving aggregation of private data, the computing system comprising:

one or more processors; and
one or more memory devices storing computer-readable instructions that, when implemented, cause the one or more processors to perform operations, the operations comprising:
receiving a plurality of multisets, the plurality of multisets comprising noise multisets and input-dependent multisets, the noise multisets being correlated to the input-dependent multisets;
debiasing the plurality of multisets based on a quantity of multisets in the plurality of multisets and a sum over values in each of the multisets; and
determining an aggregate value describing the plurality of multisets using the debiased plurality of multisets.

16. The computing system of claim 15, wherein debiasing comprises:
adding a value equal to half the quantity of multisets to the sum, wherein the sum combines values from the multisets from which a value of one half have been subtracted.

17. The computing system of claim 15, wherein:
the plurality of shuffled multisets comprise binary representations of real numbers, the binary representations having a plurality of bit positions; and
determining the aggregate value comprises:
determining a sum of the plurality of shuffled multisets at each of the plurality of bit positions independently; and
combining the sum of the plurality of shuffled multisets at each of the plurality of bit positions to determine the aggregate value.

18. One or more non-transitory, computer-readable media storing:
a randomizer configured to generate multisets based on sampling a value of a probabilistic status, wherein:
the randomizer is configured to generate noise multisets responsive to the probabilistic status having a first condition,
the randomizer is configured to generate, responsive to the probabilistic status having a second condition, input-dependent multisets that are correlated to the noise multisets; and
computer-readable instructions that, when implemented, cause one or more processors to perform operations, the operations comprising:
inputting a private value to the randomizer;
generating, using the randomizer, a multiset; and
outputting the multiset for aggregation.

19. The non-transitory, computer-readable media of claim 18, wherein the multiset comprises a noise multiset produced based in part on a noise distribution comprising a discretization of a continuous underlying distribution.

20. The non-transitory, computer-readable media of claim 19, wherein the noise multiset comprises an amount of one values equal to a randomizer value sampled from the noise distribution and an amount of zero values equal to the randomizer value subtracted from a size of the multiset.

* * * * *